US012712911B2

(12) United States Patent
Cao et al.

(10) Patent No.: US 12,712,911 B2
(45) Date of Patent: Aug. 18, 2026

(54) DNS QUERY DDOS FLOODING MITIGATION USING LEGITIMATE FQDN MATCHING

(71) Applicant: Fortinet, Inc., Sunnyvale, CA (US)

(72) Inventors: Haibin Cao, San Jose, CA (US); Stephen Robinson, Mississauga (CA); Yongping Yi, Sunnyvale, CA (US); Yuying Han, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 22 days.

(21) Appl. No.: 18/892,942

(22) Filed: Sep. 23, 2024

(65) Prior Publication Data

US 2026/0089186 A1 Mar. 26, 2026

(51) Int. Cl.
*H04L 9/40* (2022.01)
*H04L 61/4511* (2022.01)

(52) U.S. Cl.
CPC ...... *H04L 63/1458* (2013.01); *H04L 61/4511* (2022.05)

(58) Field of Classification Search
CPC ......................... H04L 63/1458; H04L 61/4511
USPC .......................................................... 726/22
See application file for complete search history.

(56) References Cited

U.S. PATENT DOCUMENTS 9,516,058 B2 * 12/2016 Antonakakis ....... H04L 61/4511
12,101,351 B2 * 9/2024 Sani .................... H04L 63/1466
12,218,914 B2 * 2/2025 Niranjan ............. H04L 61/4511
12,238,065 B2 * 2/2025 Mitchell ............... H04L 63/029
2013/0094395 A1 * 4/2013 Lopez ................... H04W 48/17 370/254
2019/0306188 A1 * 10/2019 Medvedovsky .... H04L 63/1425
2020/0204580 A1 * 6/2020 Konda .................. H04L 9/3239
2020/0351245 A1 * 11/2020 Moore ................ H04L 47/2483
2023/0156032 A1 * 5/2023 Andriani ............. H04L 63/1433 726/22
2023/0283592 A1 * 9/2023 Sevindik ............. H04L 63/0435 726/11
2024/0022539 A1 * 1/2024 Iyer ..................... H04L 61/2514
2024/0022598 A1 * 1/2024 Lyer ..................... H04L 61/2514
2024/0187447 A1 * 6/2024 Woodworth ............ H04L 63/20
2024/0333755 A1 * 10/2024 Rodriguez .......... H04L 63/1441
2024/0396871 A1 * 11/2024 Moore ................ H04L 63/0236
2025/0039130 A1 * 1/2025 Mestery ................ H04L 63/123
2025/0119418 A1 * 4/2025 Kottapalli ........... H04L 63/0807
2025/0240277 A1 * 7/2025 Pathak ................ H04L 63/1458

OTHER PUBLICATIONS

Sonia Laskar; Qualified Vector Match and Merge Algorithm (QVMMA) for DDoS Prevention and Mitigation; Sciencedirect; Year:2016; Procedia Computer Science 79 ( 2016 ) 41-52.*

* cited by examiner

*Primary Examiner* — Monjur Rahim
(74) *Attorney, Agent, or Firm* — Law Office of Dorian Cartwright; Dorian Cartwright

(57) ABSTRACT

Responsive to domain name server (DNS) flood conditions being detected, a fully qualified domain name (FQDN) of each DNS query is checked against a table of legitimate FQDNs, and DNS queries having FQDNs that are verified as legitimate queries to pass to the DNS server are allowed, and DNS queries having FQDNs not verified as legitimate queries from passing to the DNS server are blocked.

9 Claims, 6 Drawing Sheets

100

Flood Mitigation Server
110

DNS Monitoring Module
210

Flood Detector
220

FQDN Inspector
230

*FIG. 3*
Fully Qualified Domain Name
Subdomain/Host
Top-Level Domain
mail.example.org
Domain Name
Root Domain

*FIG. 2* www.example.com
mail.example.com
These are legitimate FQDNs this-is_a_random-subdomain.example.com
This is not a legitimate FQDN

DNS QUERY DDOS FLOODING MITIGATION USING LEGITIMATE FQDN MATCHING

FIELD OF THE INVENTION

The invention relates generally to computer networks, and more specifically, to flood mitigation of domain name system (DNS) queries using legitimate fully qualified domain name (FQDN) matching.

BACKGROUND

In 2023 a new DNS Query Flood began sweeping the world, mostly to government and higher education Authoritative DNS Servers. The attack exploits the anycast Recursive DNS Server networks for CloudFlare (1.1.1.1), Google (8.8.8.8) and others. These DNS service providers and all DDoS vendors are struggling to block these attacks without blocking legitimate user DNS Queries.

The queries are carefully formed using the Authoritative DNS Servers "root domains" like "fortinet.com". A subdomain is added to that root domain that has random length, random characters but word associations, so they look real and are almost impossible to filter by either the Recursive DNS Service Provider or the Authoritative DNS server owner. Attacks have reached 300,000 Queries per Second and can last many hours which is very detrimental to DNS operations.

In general, an FQDN is the entire list of labels from the Top-Level domain to the service subdomain that results in the querying entity receiving an IP address to identify the address of the service requested. It consists of a hostname (or subdomain), a Domain Name and a Top-Level Domain.

What is needed is a robust technique for flood mitigation of DNS queries using legitimate FQDN matching.

SUMMARY

To meet the above-described needs, methods, computer program products, and systems for flood mitigation of DNS queries using legitimate FQDN matching.

In one embodiment, DNS queries to a DNS server are monitored. A DNS query comprises a request to translate an FQDN into an Internet Protocol (IP) address. Flood conditions are detected from a rate of DNS queries to the DNS server.

In another embodiment, responsive to the detected flood conditions, an FQDN of each DNS query is checked against the table of legitimate FQDNs and DNS queries having FQDNs that are verified as legitimate queries to pass to the DNS server are allowed, and DNS queries having FQDNs not verified as legitimate queries from passing to the DNS server are blocked.

In yet another embodiment, the table of legitimate FQDNs is built from "in-band" FQDN via DNS responses. Additionally, the table of legitimate FQDNs is built from "out-of-band" FQDN using digs. FQDNs can be validated as legitimate queries using digs or responses. Aged FQDNs ae removed from the table.

Advantageously, computer networks and DNS network devices are improved with better network security against DNS flood attacks.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a flood mitigation server of the system of FIG. 1, according to an embodiment.

DETAILED DESCRIPTION

Methods, computer program products, and systems for flood mitigation of DNS queries using legitimate FQDN matching. The following disclosure is limited only for the purpose of conciseness, as one of ordinary skill in the art will recognize additional embodiments given the ones described herein.

Figure 2:
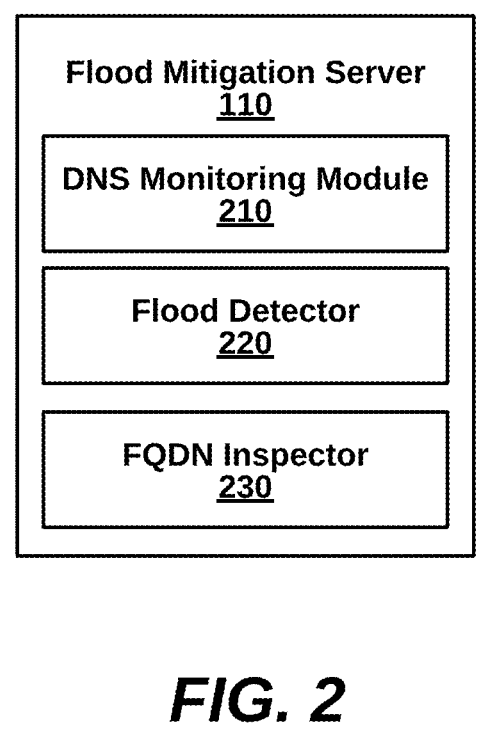
Figure 3:
FIG. 3 is a more detailed block diagram illustrating an FQDN of the system of FIG. 1, according to an embodiment.

I. Systems for Flood Mitigation (FIGS. 1-3)

Figure 1:
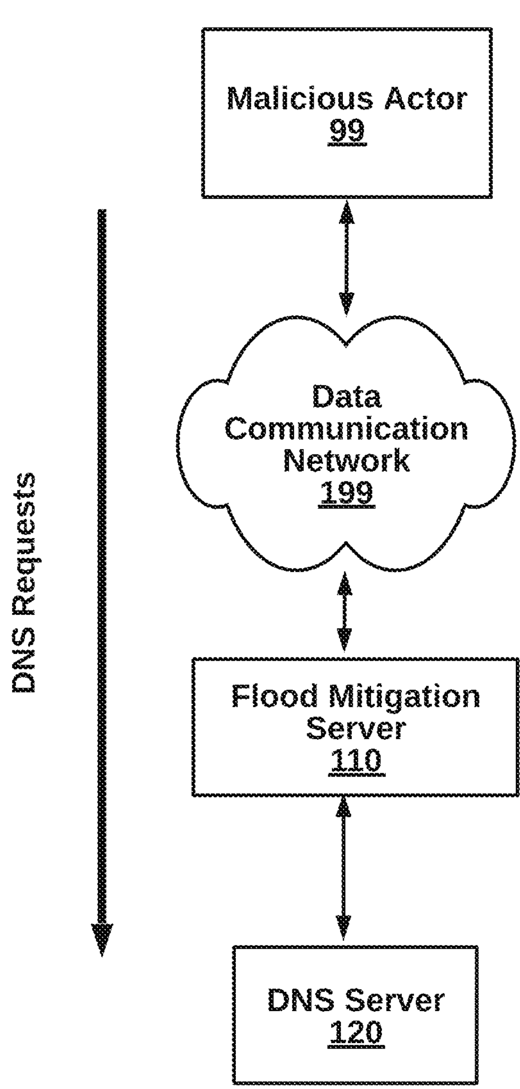
FIG. 1 is a high-level block diagram illustrating aspects of a system for flood mitigation of DNS queries using legitimate FQDN matching, according to some embodiments.
Figure 6:
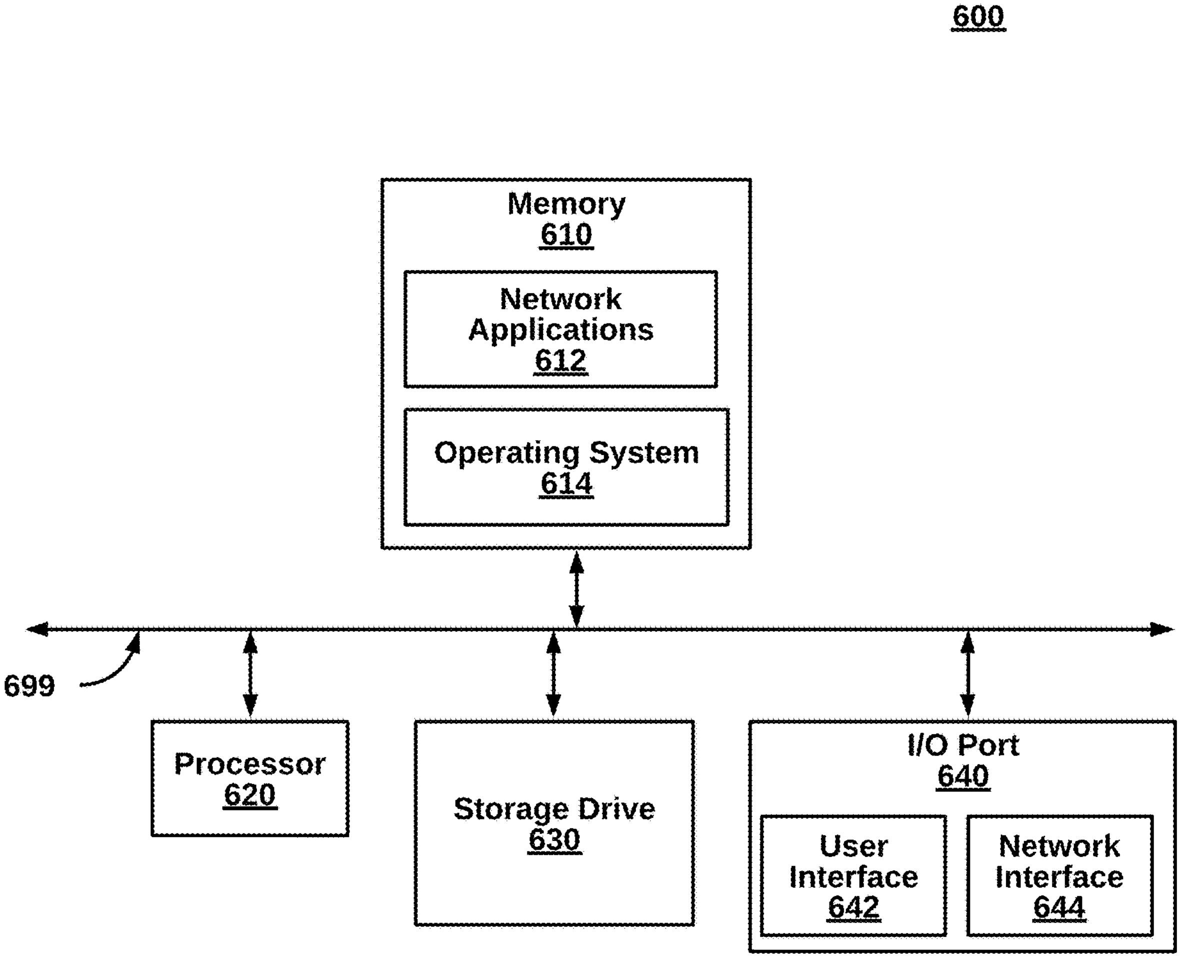
FIG. 6 is a block diagram illustrating an example computing device for the system of FIG. 1, according to an embodiment.

FIG. 1 is a high-level block diagram illustrating a system 100 for flood mitigation of DNS queries using legitimate FQDN matching, according to an embodiment. The system 100 includes a flood mitigation server 110 and a DNS server 120 coupled to a data communication network 199. Other embodiments of the system 100 can include additional components that are not shown in FIG. 1, such as routers, switches, network gateways, and firewalls, and access points. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system via hard wire (e.g., flood mitigation server 110 and DNS server 120). The components can also be connected via wireless networking (e.g., mobile smartphones). The data communication network can be composed of any combination of hybrid networks, such as an SD-WAN, a Software Defined Network (SDN), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or Ipv6 address spaces.

The flood mitigation server 110, in an embodiment, activates selective FQDN blocking during flood conditions. A default block all DNS queries is modified to allow legitimate ones. One example of flood conditions occurs when a rate of DNS queries exceeds a threshold. The threshold can rate limit an individual actor, a group of actors, or all actors. Once the rate of DNS queries falls below the threshold, regular operations can resume. During flooding, the security rules can stop all traffic from proceeding. To prevent legitimate messages from being dropped, those DNS queries that are related to a legitimate FQDN will be passed and serviced. Those DNS queries that are not related to a legitimate FQDN will be blocked, per standard operation.

A format of the FQDN is shown in FIG. 3, according to an embodiment. In some attacks, the domain name is legitimate but the sub-domain is randomized. The present techniques check legitimacy of the FQDN which detects randomized sub-domains, some of which are not legitimate. The randomized sub-domain of FIG. 3 is not legitimate. By contrast, www.example.com and mail.example.org, are both legitimate.

In yet another embodiment, the flood mitigation server builds and maintains the table of legitimate FQDNs is built from "in-band" FQDN via DNS responses. Additionally, the table of legitimate FQDNs is built from "out-of-band" FQDN using digs. FQDNs can be validated as a legitimate query, using the digs or responses. In general, the domain information grouper (dig) command is a tool that queries DNS servers and displays results. FQDNs are aged (removed) if they become invalid at some future time, which can be done with continuous digs for all FQDNs in the list. If a dig returns a good response for an FQDN, keep it, otherwise remove it. Thus, maintenance of the list, in one embodiment, includes continuously digs all the FQDNs in the list.

The Validate and Age happen simultaneously in the first dig. If the FQDN is invalid it is aged instantly—and removed. However, since FDD does not know the TTL (aging timer supplied by the DNS server) it must continue to dig all FQDNs initially found to be valid, to find any that have been removed by the DNS server owner. A future negative response to the dig results in removing that FQDN from the list.

The flood mitigation server 110 can be a standalone device or be integrated into a network gateway or other existing network security device. In one embodiment the server 110 is distributed across many parts of the network as daemons on an access point and a Wi-Fi controller, and as a downloaded application on a wireless station. Furthermore, there can also be cloud-based support.

The DNS server 120 translates domain names into an IP address. During flooding attacks by malicious actor 99 or others, the DNS server 120 can become overwhelmed, resulting in performance lags or even a shutdown. Typically DNS queries originate from browsers navigating to web sites. The browser requests that a domain name, such as www.example.com, be converted into an IP address like 216.58.217.206. The transaction process, known as DNS resolution, requires multiple hardware components, including the DNS server. Secondary DNS servers can back up a primary DNS server.

In one embodiment, the DNS server 120 is a is an authoritative DNS name server in communication with recursive DNS servers.

FIG. 2 is a more detailed block diagram illustrating the flood mitigation server 110 of the system of FIG. 1, according to one embodiment. The mitigation server 110 includes a legitimate FQDN database 105, a DNS monitoring module 210, a flood detector 220, and an FQDN inspector 230. The components can be implemented in hardware, software, or a combination of both.

The DNS monitoring module 210 can monitor DNS queries to a DNS server. A DNS query comprises a request to translate an FQDN into an Internet Protocol (IP) address. In one embodiment, the DNS monitoring module submits new or updated legitimate FQDNs to the legitimate FQDN database 105. Over time, DNS query behavior can be modeled.

The legitimate FQDN database 105 can be one or more searchable lists or tables of FQDNs from DNS queries that have been validated. New FDQNs are submitted for addition to the list. On the other hand, stale FQDNs are removed from legitimate status. An individual FQDN can become stale from nonuse in DNS requests.

The flood detector 220 is able to detect flood conditions from a rate of DNS queries to the DNS server 110. A threshold can be manually set by a network administrator or it can be automatically set by a process. A number of data packets received over a window of time is one example of rate measurement. The rate can be observed during the monitoring.

Additionally, the rate can be updated.

The FQDN inspector 230 to, responsive to the detected flood conditions, check an FQDN of each DNS query against the table of legitimate FQDNs provided by the DNS monitoring module 210. The FQDN inspector 230 allows DNS queries having FQDNs that are verified as legitimate queries to pass to the DNS server. DNS queries having FQDNs not verified as legitimate queries are blocked from passing to the DNS server.

II. Methods for Flood Mitigation (FIGS. 4-5)

Figure 4:
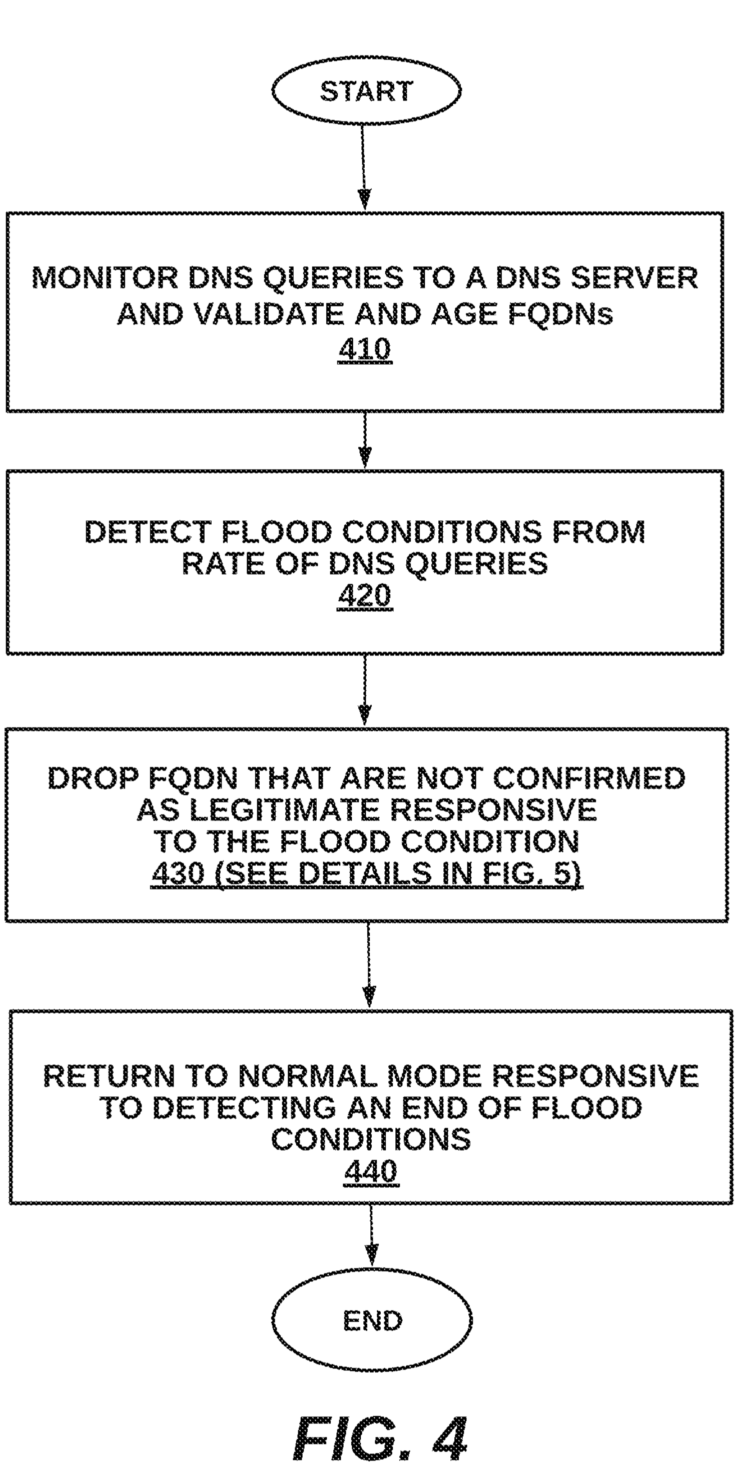
FIG. 4 is a high-level flow diagram illustrating a method for flood mitigation of DNS queries using legitimate FQDN matching, according to an embodiment.
Figure 5:
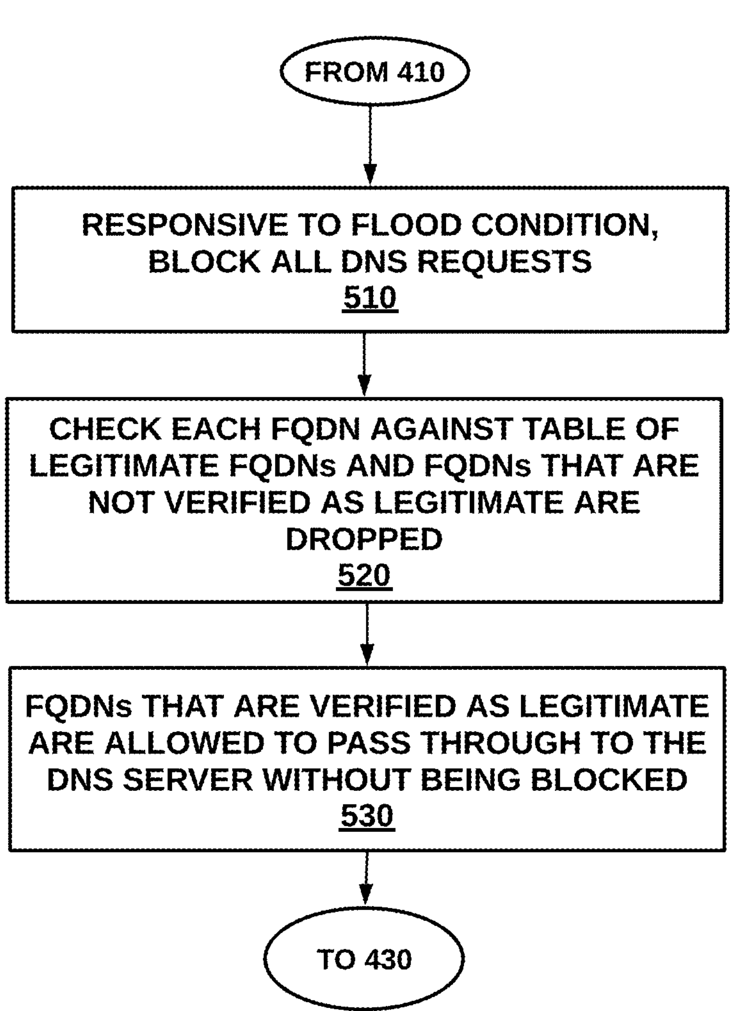
FIG. 5 is a flow diagram illustrating a step of passing through legitimate FQDNs during flood mitigation, from the method of FIG. 5, according to an embodiment.

FIG. 4 is a high-level flow diagram of a method 400 for flood mitigation of DNS queries using legitimate FQDN matching, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, DNS queries to a DNS server are monitored. Individual actors can be monitored to identify malicious behavior, in some implementations, the individual actor can represent a single device or 1000's of botted devices. A DNS query comprises a request to translate an FQDN into an Internet Protocol (IP) address. In an embodiment, DNS queries with FQDNs found to be valid are stored in the legitimate FQDN database. DNS queries can originate from browsers navigating to web sites, and also from non-browser machine-to-machine queries. The browser requests that a domain name, such as www.example.com, be converted into an IP address like 216.58.217.206. The transaction process, known as DNS resolution, requires multiple hardware components, including the DNS server.

Additionally, the table of legitimate FQDNs can be maintained by validating and aging FQDNs of the DNS queries. This keeps the table automatically updated. In some embodiments, there is no access to time to live (TTL) data of the DNS server, so aging is needed.

Building a Table of Legitimate FQDNs that have Passed Validation for Use During Flood Conditions At step 420, flood conditions can be detected from a rate of DNS queries to the DNS server. The rate can be constantly monitored or periodically checked. An upsurge in rate can trigger the present disclosure until the rate falls back below a threshold.

At step 430, responsive to the detected flood conditions, FQDN that are not legitimate are blocked or dropped. More specifically, FIG. 5 shows details of step 430, according to an embodiment. At step 510, responsive to the detected flood conditions, an FQDN of each DNS query is checked against the table of legitimate FQDNs. At step 520, DNS queries having FQDNs that are verified as legitimate queries are allowed to pass to the DNS server. At step 530, DNS queries having FQDNs not verified as legitimate queries are blocked from passing to the DNS server.

Returning to FIG. 4, at step 440, responsive to an end of the flood, FQDN are no longer inspected for legitimacy. Standard DNS filtering can be returned until the next flood.

III. Computing Device for Flood Mitigation (FIG. 6)

FIG. 6 is a block diagram illustrating a computing device 600 for use in the system 100 of FIG. 1, according to one embodiment. The computing device 600 is a non-limiting example device for implementing each of the components of the system 100, including flood migration server 110 and DNS server 120. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 can be a RAM memory device storing network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, SSD or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer ⅔ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention, DDoS prevention, DDoS function, and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL and FORTIPHISH families of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORTIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a network security device, for flood mitigation of domain name system (DNS) queries using legitimate fully qualified domain name (FQDN) matching, the method comprising:

monitoring DNS queries to a DNS server, wherein a DNS query comprises a request to translate an FQDN into an Internet Protocol (IP) address;

validating and aging an FQDN of the DNS queries using digs of the DNS server;

building a table of legitimate FQDNs that have passed validation for use during flood conditions;

detecting flood conditions from exceeding a rate of DNS queries to the DNS server; and responsive to the detected flood conditions, checking an FQDN of each DNS query against the table of legitimate FQDNs and:

allowing DNS queries having FQDNs that are verified as legitimate queries to pass to the DNS server; and blocking DNS queries having FQDNs not verified as legitimate queries from passing to the DNS server.

2. The method of claim 1, wherein validation comprises capturing the FQDN from the DNS query and validating FQDN “in-band”.

3. The method of claim 1, wherein validation comprises capturing the FQDN from the DNS query and validating FQDN “out-of-band”.

4. The method of claim 1, further comprising: detecting an end to the flood conditions, and responsive to the detected end of the flood conditions, discontinuing the checking for FQDN.

5. The method of claim 1, wherein the rate of DNS queries is updated.

6. The method of claim 1, wherein aging of FQDNs occur without access to a time to live TTL set by the DNS server.

7. The method of claim 1, wherein validation is determined from a DNS response of the DNS server to a DNS query.

8. A non-transitory computer-readable medium in a network security device, on a data communication network, storing code that when executed, performs a method for flood mitigation of domain name system (DNS) queries using legitimate fully qualified domain name (FQDN) matching, the method comprising:

monitoring DNS queries to a DNS server, wherein a DNS query comprises a request to translate an FQDN into an Internet Protocol (IP) address;

validating and aging an FQDN of the DNS queries;

building a table of legitimate FQDNs that have passed validation for use during flood conditions;

detecting flood conditions from exceeding a rate of DNS queries to the DNS server; and responsive to the detected flood conditions, checking an FQDN of each DNS query against the table of legitimate FQDNs and:

allowing DNS queries having FQDNs that are verified as legitimate queries to pass to the DNS server; and blocking DNS queries having FQDNs not verified as legitimate queries from passing to the DNS server.

9. A network security device, on a data communication network, for flood mitigation of domain name system (DNS) queries using legitimate fully qualified domain name (FQDN) matching, the network security device comprising:

a processor;

a network interface communicatively coupled to the processor and to a data communication network; and a memory, communicatively coupled to the processor and storing:

a DNS monitor module to monitor DNS queries to a DNS server, wherein a DNS query comprises a request to translate an FQDN into an Internet Protocol (IP) address;

an FQDN validation module to validate and age an FQDN of the DNS queries;

a dynamic FQDN legitimacy module to build a table of legitimate FQDNs that have passed validation for use during flood conditions;

a flood detector to detect flood conditions from a rate of DNS queries to the DNS server; and an FQDN blocker to, responsive to the detected flood conditions, check an FQDN of each DNS query against the table of legitimate FQDNs and:

allow DNS queries having FQDNs that are verified as legitimate queries to pass to the DNS server; and block DNS queries having FQDNs not verified as legitimate queries from passing to the DNS server.

* * * * *